Sept. 25, 1962 R. SCHULTZ 3,055,607
FISHING REEL WITH SPOOL TRANSVERSING MECHANISM
Filed Aug. 21, 1961

United States Patent Office 3,055,607
Patented Sept. 25, 1962

3,055,607
FISHING REEL WITH SPOOL TRANSVERSING MECHANISM
Rudolf Schultz, Berlin-Wansee-Kohlhasen-Bruck, Germany, assignor to Deutsche Angelgerate Manufaktur D. A. M. Helimuth Kuntze, Berlin, Germany
Filed Aug. 21, 1961, Ser. No. 132,858
Claims priority, application Germany May 19, 1961
2 Claims. (Cl. 242—84.21)

This invention relates to a fishing reel in which the non-rotating spool shaft which is disposed coaxially to the rotatable shaft of the line collecting head executes a reciprocating movement through an excentric member which engages guide means arranged perpendicularly relative to the input shaft of the drive over a two-member planetary gear transmission whose wheel is disposed coaxially to the input shaft of the drive.

In this type of fishing reel the reciprocating movement of the spool is decreased relative to the rotary movement of the line collecting head so that the fishing line is distributed in an improved manner over the spool during the winding operation. In prior art fishing reels of this type one of the wheels of the planetary gear drive is rigidly connected to the housing in order to be held securely in position against rotation. This type of construction presents the disadvantage that the reciprocating movement derived from the free wheel of the planetary gear drive is irregular. This unsteady actuation of the shaft means connected to the spool results therefore in a non-uniform distribution of the fishing line over the spool.

It is an object of the invention to produce a sine-like reciprocating movement which assures a uniform distribution of the fishing line onto the spool and thus a uniform unwinding of the line during the casting action.

The invention resides in that the wheel of the planetary gear drive is journalled freely rotatable in the input shaft of the driving assembly and carries the excentric member while the planetary gear is secured to the housing of the fishing reel in such a way as to execute a restrained or controlled rotating movement. Due to this arrangement the kinematic or linkage movements of the planetary gear drive which could result in an irregular movement of the spool are eliminated by means of an oscillating movement of the planetary gear around its pivot point, so that the wheel executes a uniform movement which is converted through the excentric member into the desired sine-like reciprocating movement.

According to an additional feature of the invention the planteary wheel is formed like a dished wheel. The open or flanged side of this wheel is directed toward the input shaft, and at the side which is directed toward the spool shaft the wheel carries the excentric member which is connected to the spool shaft. The planetary gear is mounted on an excentric journal, boss or collar of the input wheel or crown gear of the driving assembly and has a central aperture for accommodating the bearing pin of the wheel. The connection of the planetary gear to the housing of the fishing reel is accomplished in that the planetary gear carries an arm which extends outwardly between the crown gear and the planetary wheel and is bent upwardly and outwardly, and its outer end is provided with a longitudinal outwardly open slot which engages a pin which is secured to the reel housing.

It is therefore also an object of this invention to provide a fishing reel which comprises transmission means adapted to execute a controlled rotary movement in order to reciprocate the spool shaft in a uniformly steady movement.

The above objects as well as other objects and features of the invention will become apparent upon reading the following detailed description in connection with the accompanying drawing in which.

Figure 1:
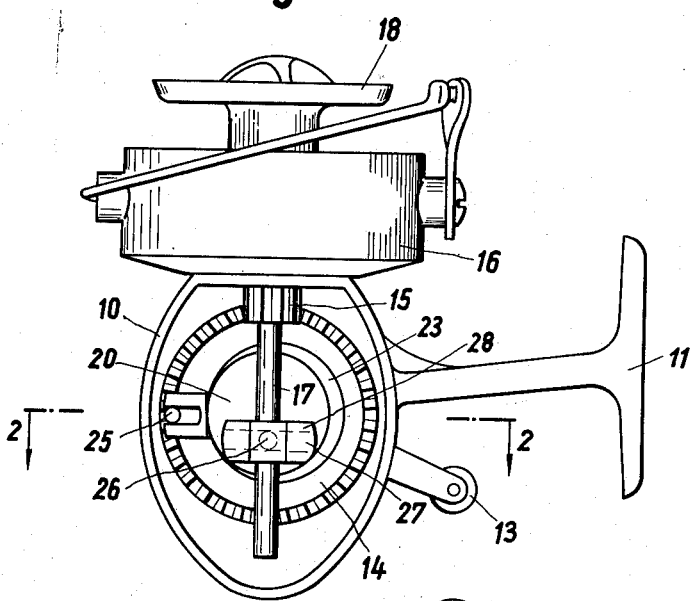
FIG. 1 is a side view of a fishing reel according to the invention with the housing cover removed.
Figure 2:
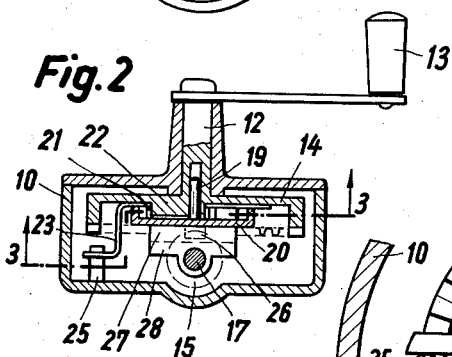
FIG. 2 is a cross-section through the reel drive in the direction of the arrows along line 2—2 of FIG. 1.
Figure 3:
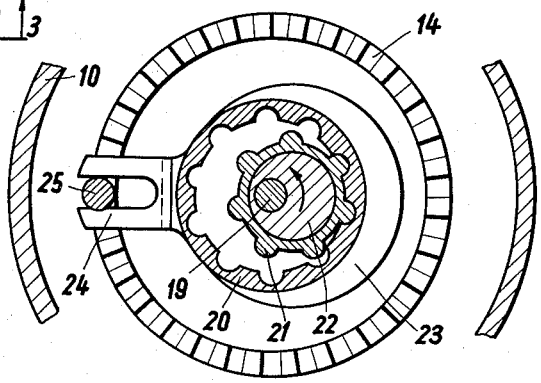
FIG. 3 is a cross-section in the direction of the arrows along line 3—3 of FIG. 2, on a larger scale.

The fishing reel according to the invention comprises a housing 10 having a support post 11 provided with opposed tongues to be fixed upon a fishing rod in a known manner. The input shaft 12 of the reel drive is journalled in housing 10 and may be operated by means of a hand crank 13. An input wheel 14 in the form of a crown gear which is part of a conventional angular driving arrangement is connected to input shaft 12. The crown gear 14 drives a pinion or spur gear 15 which constitutes the support and drive shaft of a line collecting head 16 of conventional construction. Upon rotation of the hand crank 13 the line collecting head 16 is thus driven at a speed which is a multiple of the speed of the rotation of the hand crank 13.

A non-rotatable shaft 17 is journalled coaxially within spur gear 15 and is connected to the spool 18 which is adapted to receive the fishing line. This shaft 17 may execute a back and forth movement in order to impart to spool 18 the desired reciprocation during the winding and unwinding of the line. This movement takes place over a planteary gear drive and over a guide assembly associated with this gear drive, as described more specifically hereafter.

The input shaft 12 has a central bore at the front side remote from the hand crank. This central bore is adapted to receive a longitudinal pin 19 which is fixed to a wheel 20 of the planetary gear drive. This planetary wheel 20 is of a dish like configuration and has a circumferential flange provided with inner teeth which mesh with the rounded outer teeth of a planetary gear 21 which is rotatably mounted on an excentric boss 22 of the crown gear 14. Planetary gear 21 is provided with an aperture which is traversed by the bearing pin 19 of the annular wheel 20. The planetary gear 21 carries an arm 23 which extends outwardly between the crown gear 14 and the planetary wheel 20 and is bent at two points, first upwardly and then outwardly. At its outer extremity arm 23 has an outwardly open longitudinal slot 24 which engages a pin 25 secured to housing 10. This slot allows the arm 23 to move relative to pin 25 when gear 21 is driven in response to the rotation of input shaft 12.

A pin 26 is secured to the underside of planetary wheel 20 excentrically to the bearing pin 19. This excentric pin 26 engages a guide slot 27 of a guide assembly disposed perpendicularly to the input shaft 12. The guide slot 27 is located in a block 28 which is connected to shaft 17 of line spool 18.

Upon rotation of hand crank 13 the planetary gear 21 is moved by means of crown gear 14 in a circular path around the axis of the crown gear and thus drives the planetary wheel 20 at a reduced speed. The planetary wheel is driven with a uniformly even rotary movement because the effects which might prevent steady, even movement due to kinematic or linkage conditions are absorbed by the movement which the planetary gear 21 may execute with and relative to journal 22. In the example shown and described herein the planetary wheel 20 is provided with 10 teeth while the planetary gear 21 has 7 teeth. This produces therefore in the planetary gear drive a speed reduction of $$\frac{10}{10-7} = \frac{10}{3}$$

The ratio of the reciprocating movement of the spool relative to the rotary movement of the line collecting head corresponds to the product of the transmission of the angular drive and the reduction ratio of the planetary gear drive.

The construction according to the invention provides, aside from the apparent functional advantages, a simple and therefore inexpensive as well as compact structure so that an undesirable enlargement of the housing for reasons of space requirements or weight is not necessary.

What is claimed is:

1. A fishing reel comprising a housing, a rotatable collecting head, a gear connected to said head, a line spool mounted for reciprocation within said head, driving means for said line spool and said head, said driving means including a rotatable input shaft, a crown gear connected coaxially to said input shaft and engaging said gear, a non-rotatable shaft extending through said gear and connected to said line spool, said input shaft having a central bore, a planetary wheel, a pin member connected centrally to said planetary wheel and mounted freely in said central bore, a peripheral flange on said planetary wheel confronting said input shaft and having inner teeth, an excentric boss connected to said crown gear, a planetary gear rotatably mounted on said excentric boss and engaging said inner teeth of said planetary wheel, a control arm connected to said planetary gear and disposed between said crown gear and said planetary wheel, said control arm having an outer slotted extremity, a pin member connected to said housing and engaging said slotted extremity, an excentric member connected to said planetary wheel and confronting said non-rotatable shaft, a guide block and fixed to said non-rotatable shaft, said guide block having a guide slot for receiving said excentric member, said planetary gear traveling in a circular path responsive to rotation of said input shaft so as to rotate said planetary wheel and move said excentric member to actuate said guide block and reciprocate said non-rotatable shaft.

2. A fishing reel according to claim 1 wherein said planetary gear has an opening for receiving the pin member connected to said planetary wheel.

References Cited in the file of this patent

UNITED STATES PATENTS

| | | |
|---|---|---|
| 886,938 | Brush | May 5, 1908 |
| 2,713,971 | Bud et al. | July 26, 1955 |
| 2,990,130 | Pons | June 27, 1961 |